(12) United States Patent
Kobayashi

(10) Patent No.: US 7,321,244 B2
(45) Date of Patent: Jan. 22, 2008

(54) CLOCK SWITCHING DEVICE AND CLOCK SWITCHING METHOD

(75) Inventor: Naoki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/391,341

(22) Filed: Mar. 29, 2006

(65) Prior Publication Data

US 2006/0221070 A1  Oct. 5, 2006

(30) Foreign Application Priority Data

Mar. 30, 2005  (JP)  ............................. 2005-100150

(51) Int. Cl.
*H03K 17/00*  (2006.01)
*G06F 1/08*  (2006.01)
(52) U.S. Cl. .................. 327/99; 327/294; 327/298; 327/407
(58) Field of Classification Search .................. 327/99, 327/20, 291, 292, 294, 298, 407–410
See application file for complete search history.

(56) References Cited

U.S. PATENT DOCUMENTS 5,483,185 A * 1/1996 Scriber et al. ................. 327/99
5,828,243 A * 10/1998 Bagley ........................ 327/99
5,903,748 A    5/1999 McCollough et al.
5,969,558 A * 10/1999 Abe ............................ 327/292
6,107,841 A *  8/2000 Goodnow ..................... 327/99
6,469,544 B2* 10/2002 Kimura ........................ 327/20
7,046,048 B2*  5/2006 Starr et al. .................... 327/99

FOREIGN PATENT DOCUMENTS

WO     WO 95/35608     12/1995

* cited by examiner

Primary Examiner—Linh My Nguyen
Assistant Examiner—Patrick O'Neill
(74) Attorney, Agent, or Firm—Foley and Lardner LLP

(57) ABSTRACT

A clock switching device capable of automatic switching to a clock distribution system for back-up without interrupting processing of the device, which includes an abnormality detection unit which detects lack of coincidence in a logical level between a current clock pulse and a one-cycle preceding clock pulse as abnormality in a waveform on the basis of a plurality of cock pulses, a phase adjustment unit for switching which adjusts a phase of other clock pulse to a phase of a clock pulse being output, and a switching unit which switches to and outputs other clock pulse whose phase is adjusted by the phase adjustment unit for switching based on detection of lack of coincidence in a logical level by said abnormality detection unit.

6 Claims, 7 Drawing Sheets

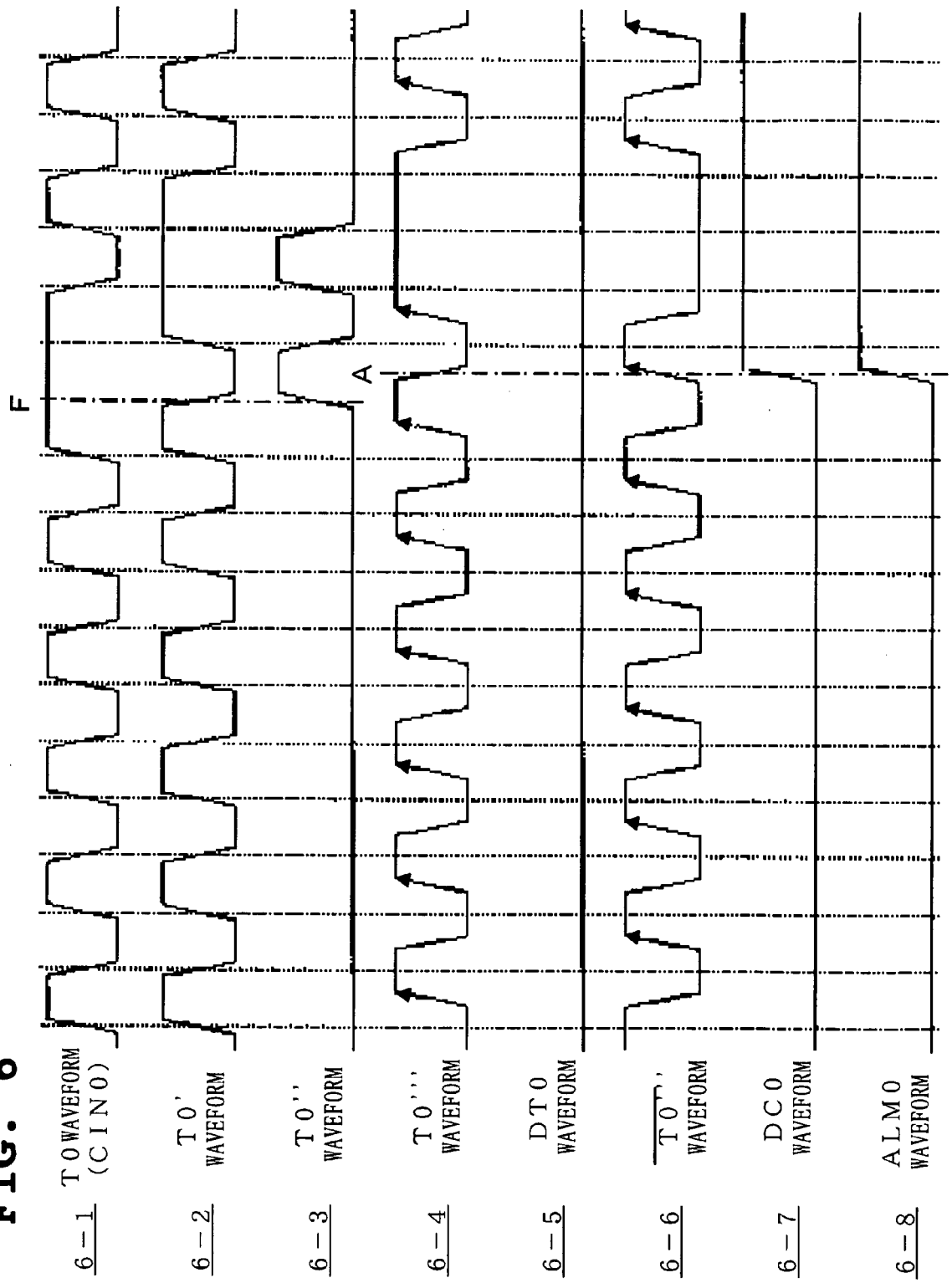

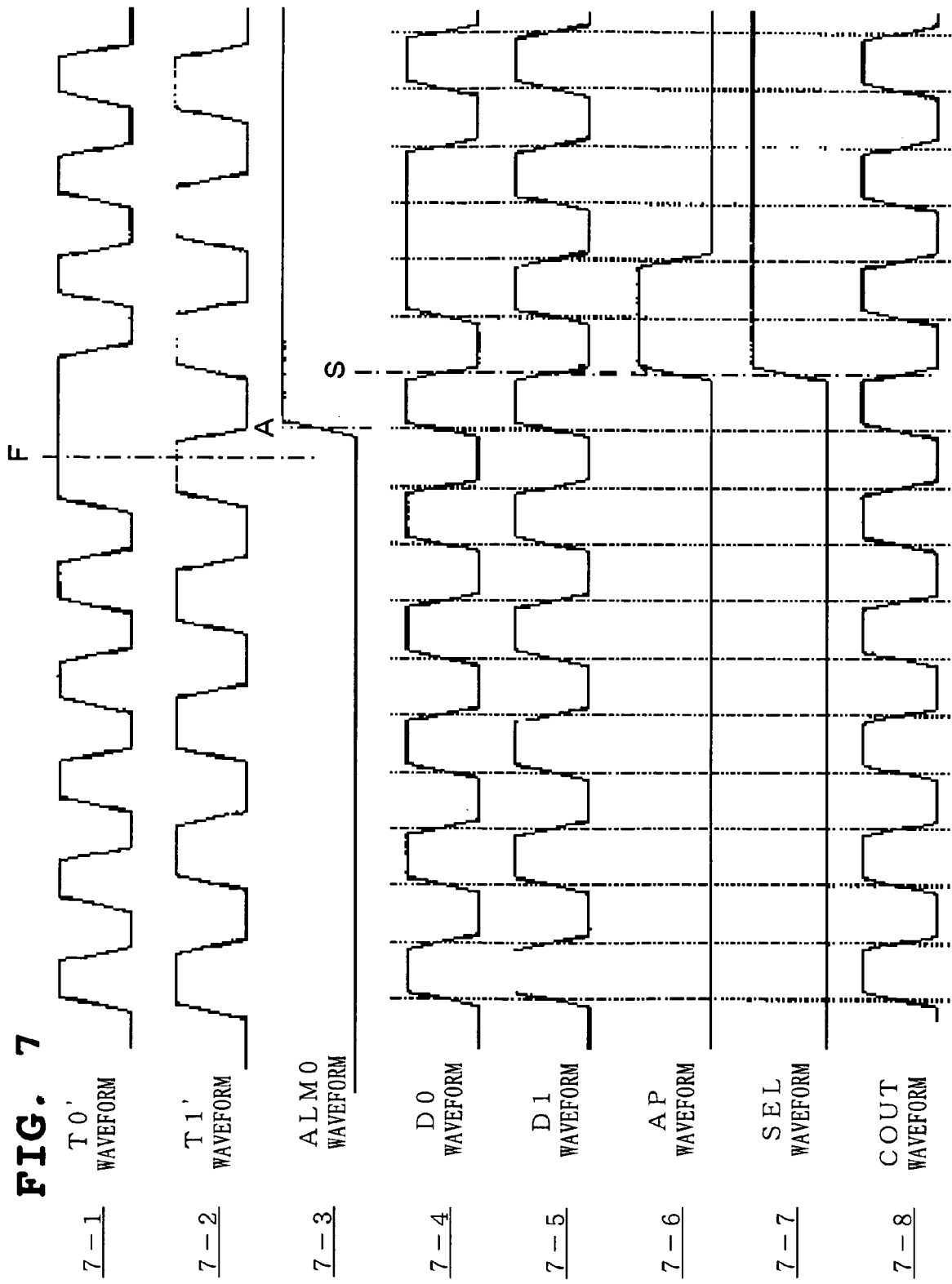

CLOCK SWITCHING DEVICE AND CLOCK SWITCHING METHOD

BACKGROUND OF THE INVENTION

1. Field of the Invention

The present invention relates to a clock switching device which switches a clock to be supplied to an information processing device (computer device) and, more particularly, to a clock switching device capable of detecting abnormality in a waveform to switch a clock, and a clock switching method.

2. Description of the Related Art

When a failure occurs in a clock distribution system, because it is a conventionally practice to restart a device after replacing a part suspected to develop the fault, processing of the device should be interrupted at the time of recovering from the failure.

One example of conventional clock switching devices is recited in Literature 1 (Japanese Translation of PCT International Application No. H09-510338). While the clock switching device recited in Literature 1 proposes a circuit which matches phases of two input clocks to switch a clock, because it is premised on a clock of the same oscillation source (synchronization), when an oscillation source develops a fault, the processing of the device should be interrupted to replace a part suspected to develop the fault, so that it is necessary to interrupt the processing of the device to restart the device.

In addition, since the clock switching device has no function of detecting abnormality in a waveform, some other means should be provided for detecting a failure of a clock distribution system to instruct on switching of an input clock.

One example of clock switching devices which solves such a conventional problem is recited in Literature 2 (U.S. Pat. No. 5,903,748) as an asynchronous clock switching circuit with which no clock pulse is interrupted at the time of recovering from a failure of a device.

The above-described conventional clock switching device, however, has a problem of having a larger jitter than that of a clock generated by a quartz oscillator with high precision because of use of a VCO (voltage controlled oscillator).

SUMMARY OF THE INVENTION

An object of the present invention is to provide a clock switching device capable of automatic switching to a clock distribution system for back-up without interrupting processing of the device when one of two clock distribution systems with high precision and a small jitter whose oscillation sources are different develops a fault, and a clock switching method.

In order to achieve the above-described object, according to the present invention, a clock switching device for switching a clock to be supplied to an information processing device is structured to have a unit which executes, when detecting abnormality in a waveform of a clock pulse being output among a plurality of clock pulses applied, switching to other clock pulse whose phase is matched with that of the clock pulse being output and outputting the same.

In addition to the above-described mode, a preferred mode of the present invention includes an abnormality detection unit which detects lack of coincidence in a logical level between a current clock pulse and a one-cycle preceding clock pulse on the basis of a plurality of clock pulses, a phase adjustment unit for switching which adjusts a phase of other clock pulse to a phase of a clock pulse being output, and a switching unit which switches a pulse to other clock pulse whose phase is matched by the phase adjustment unit for switching based on detection of lack of coincidence in a logical level by the abnormality detection unit.

In addition to the above-described modes, a further preferred mode of the present invention includes a phase adjustment unit for detection which matches phases of a current clock pulse and a one-cycle preceding clock pulse on the basis of a plurality of clock pulses, in which from the phase adjustment unit for detection to the phase adjustment unit for switching, a clock pulse being output and other clock pulse are output.

In addition to the above-described modes, a still further preferred mode of the present invention includes a switching signal generation unit which generates a signal for switching to other clock pulse when the abnormality detection unit detects lack of coincidence, in which the switching unit switches a clock pulse based on the switching signal from the switching signal generation unit.

According to the present invention, a clock switching device can be realized which is capable of automatic switching to a clock distribution system for back-up without interrupting processing of a device.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 6 is a time chart showing operation of the component of the clock switching device according to the embodiment of the present invention; and FIG. 7 is a time chart showing operation of the component of the clock switching device according to the embodiment of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment (Description of Structure of Clock Switching Device)

Figure 1:
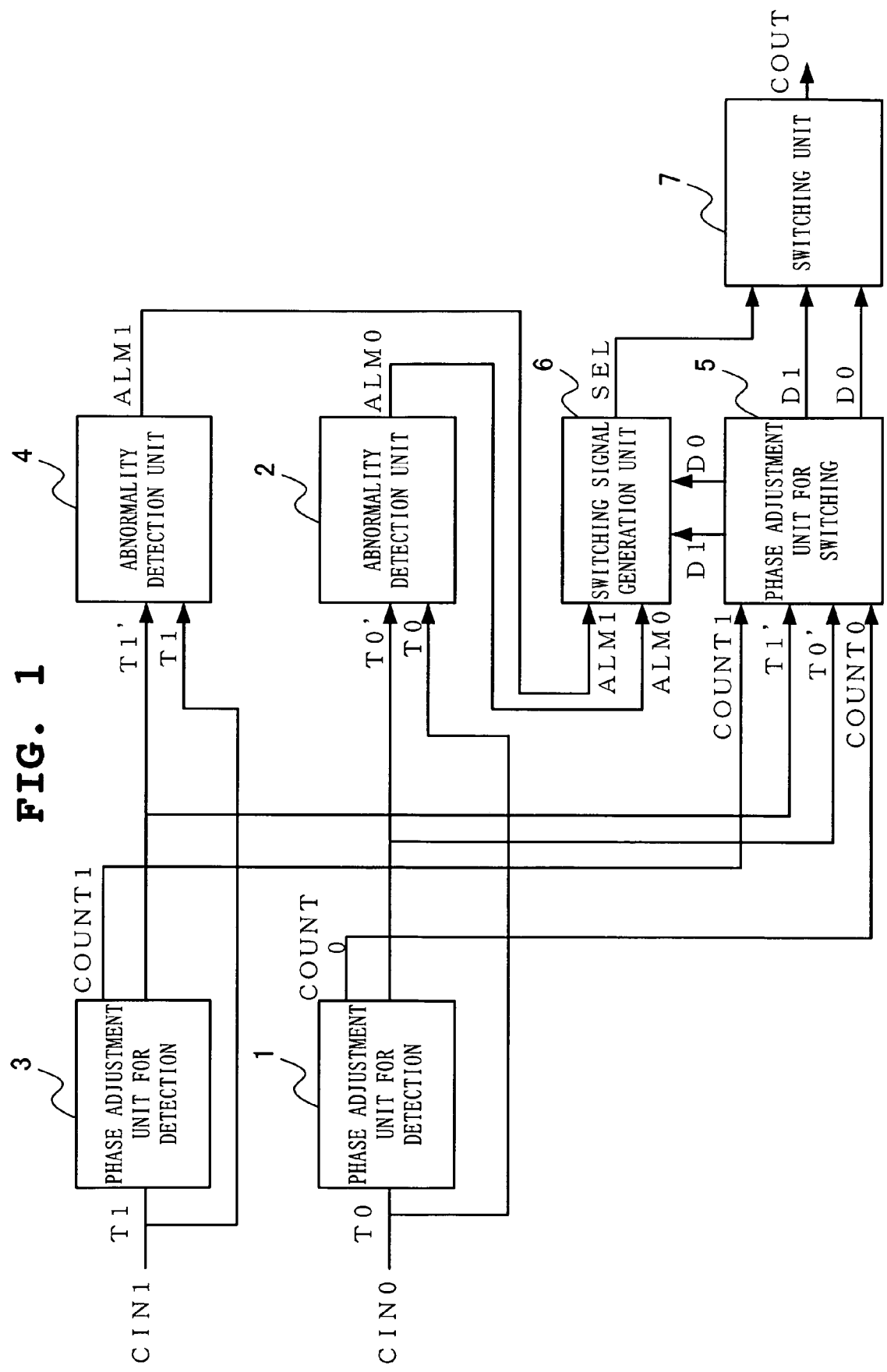
FIG. 1 is a block diagram showing a structure of a clock switching device according to an embodiment of the present invention.

FIG. 1 is a block diagram showing a structure of a clock switching device provided in an information processing device (computer device) according to the embodiment of the present invention or connected to an information processing device for switching a clock to be supplied to the information processing device.

With reference to FIG. 1, the clock switching device according to the embodiment of the present invention includes a first phase adjustment unit 1 for detection, a first abnormality detection unit 2, a second phase adjustment unit 3 for detection, a second abnormality detection unit 4, a phase adjustment unit 5 for switching, a switching signal generation unit 6 and a switching unit 7.

The first phase adjustment unit 1 for detection has a function of comparing phases of a certain clock pulse T0 of a first clock distribution system CIN0 and a one-cycle preceding clock pulse T0' to match their phases.

The first abnormality detection unit 2 has a function of discriminating logical levels (High/Low) of the clock pulses T0 and T0' and outputting the discrimination result as ALM0 information.

The second phase adjustment unit 3 for detection has a function of comparing phases of a certain clock pulse T1 of a second clock distribution system CIN1 and a one-cycle preceding clock pulse T1' to match their phases.

The second abnormality detection unit 4 has a function of discriminating logical levels (High/Low) of the clock pulses T1 and T1' and outputting the discrimination result as ALM1 information.

The phase adjustment unit 5 for switching has a function of comparing phases of a certain clock pulse D0 of the first clock distribution system CIN0 and a certain clock pulse D1 of the second clock distribution system CIN1 to match their phases.

The switching signal generation unit 6 has a function of switching a switching signal SEL based on the ALM0 information and the ALM1 information.

The switching unit 7 has a function of selecting the first clock distribution system CIN0 or the second clock distribution system CIN1 to output the selection result as COUT based on the switching signal SEL.

Figure 2:
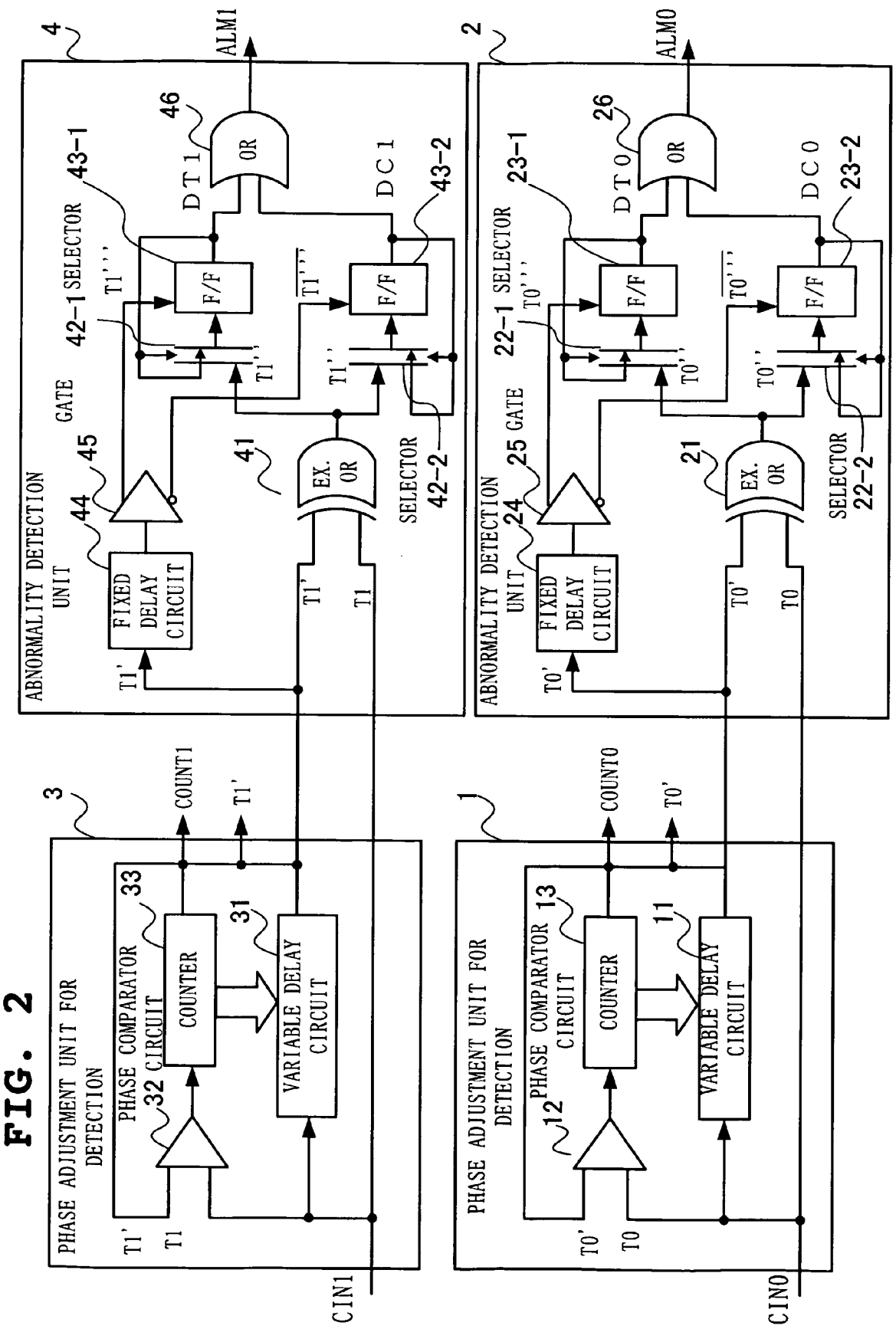
FIG. 2 is a block diagram showing a structure of a component of the clock switching device according to the embodiment of the present invention.

FIG. 2 is a block diagram showing detailed structures of the first phase adjustment unit 1 for detection, the first abnormality detection unit 2, the second phase adjustment unit 3 for detection and the second abnormality detection unit 4 which form a part of the clock switching device illustrated in FIG. 1.

In FIG. 1 and FIG. 2, a phase comparator circuit 12 in the first phase adjustment unit 1 for detection compares phases of a certain clock pulse T0 of the first clock distribution system CIN0 and a one-cycle preceding clock pulse T0' and when the phase of T0 precedes, instructs a counter 13 to count up and when the phase of T0 succeeds, instructs to count down.

A variable delay circuit 11 increments or decrements the amount of delay according to a value of the counter 13.

The variable delay circuit 31, phase comparator circuit 32, and counter 33 work of the second phase adjustment unit for detection 2 work in a similar fashion to those corresponding parts of the first phase adjustment unit for detection 1. The ExOr circuit 41, selector 42-1, F/F (Flip-Flop circuit) 43-1, selector 42-2, F/F 43-2, fixed delay circuit 44, gate 45, and OR circuit 46 of the second abnormality detection unit 4 work in similar fashion to those corresponding parts in the first abnormality detection unit 2.

An ExOR circuit 21 in the first abnormality detection unit 2 outputs a result T0'' of exclusive OR operation of the clock pulses T0 and T0'.

A fixed delay circuit 24 and a gate 25 apply a specific delay to the clock pulse T0' to output both positive logic T0''' and negative logic /T0'''.

A selector 22-1 and an F/F (Flip-Flop circuit) 23-1 output DT0 obtained by taking in and holding logic 1 (High level) of T0'' at a leading edge of T0'''.

A selector 22-2 and an F/F 23-2 output DC0 obtained by taking in and holding the logic 1 (High level) of T0'' at a trailing edge of/T0'''.

An OR circuit 26 outputs a result of logical OR of DT0 and DC0 as ALM0.

As a result, when the logical level (High/Low) of the clock pulse T0 and that of T0' fail to coincide with each other, ALM0 attains High.

Figure 3:
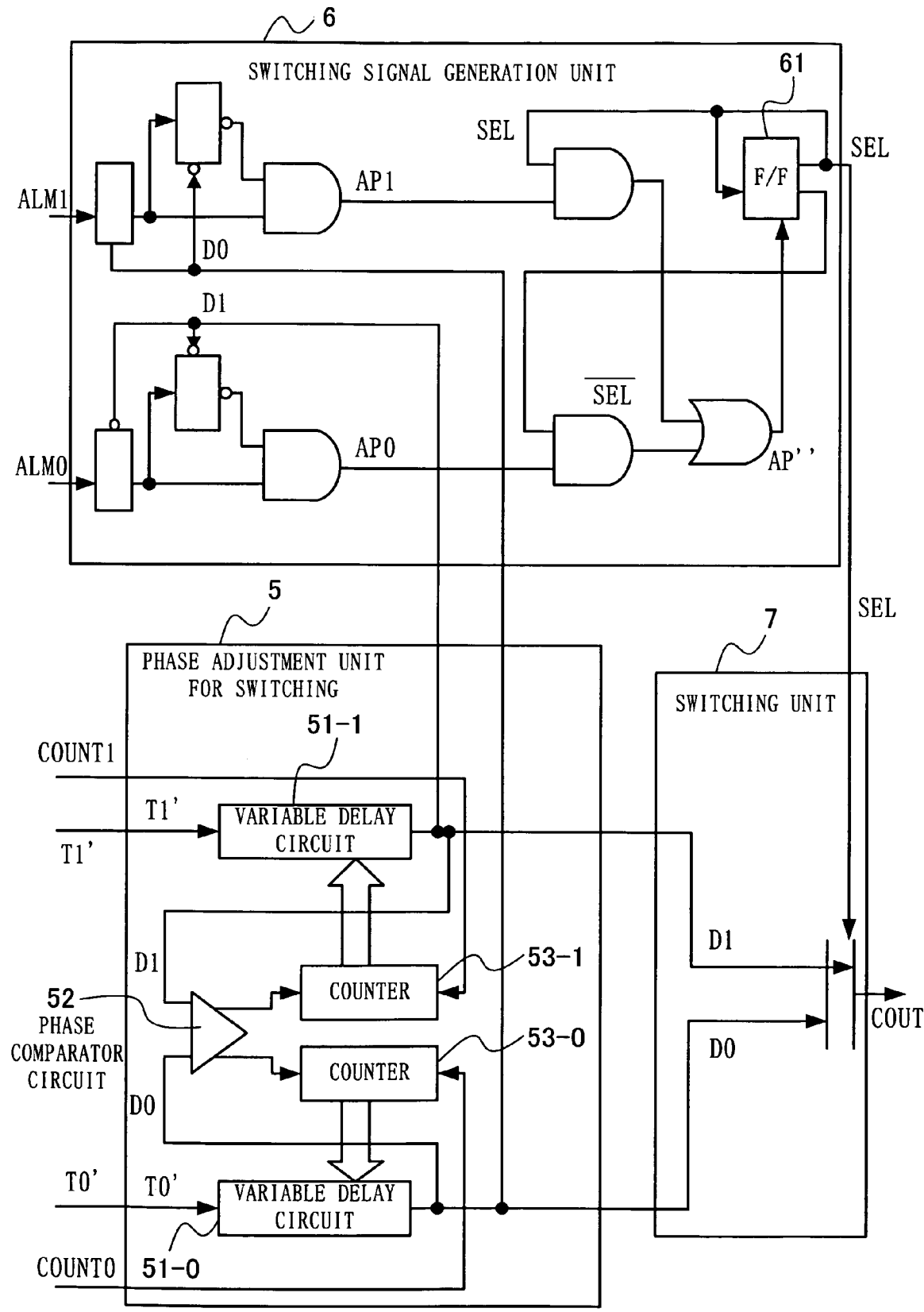
FIG. 3 is a block diagram showing a structure of a component of the clock switching device according to the embodiment of the present invention.

FIG. 3 is a block diagram showing detailed structures of the phase adjustment unit 5 for switching, the switching signal generation unit 6 and the switching unit 7 which form a part of the clock switching device illustrated in FIG. 1.

As shown in FIG. 3, a phase comparator circuit 52 in the phase adjustment unit 5 for switching compares phases of a certain clock pulse D0 of the first clock distribution system CIN0 and a certain clock pulse D1 of the second clock distribution system CIN1 and when the phase of D0 precedes, instructs a counter 53-0 to count up and a counter 53-1 to count down and when the phase of D0 succeeds, instructs the counter 53-0 to count down and the counter 53-1 to count up.

A variable delay circuit 51-0 increments or decrements the amount of delay according to a value of the counter 53-0 and a variable delay circuit 51-1 increments or decrements the amount of delay according to a value of the counter 53-1.

At this time, it is known that CIN0 and CIN1 are from different oscillation sources. In order to match the phases of D0 and D1, the counters 53-0 and 53-1 count up or down all the time to make subtraction or addition of counter values of the counters 13 and 33 in the phase adjustment units for detection 1 and 3 before the variable delay circuits 51-0 and 51-1 go to the MAX side or to the MIN side.

This keeps a state where the phases of a certain clock pulse D0 of the first clock distribution system CIN0 and a certain clock pulse D1 of the second clock distribution system CIN1 are coincident with each other.

The switching signal generation unit 6 switches the switching signal SEL to High in a case where when SEL is at Low, ALM0 goes from Low to High and keeps the same High without switching in a case where when SEL is at High, ALM0 goes from Low to High.

In addition, switch the switching signal SEL to Low in a case where when SEL is at High, ALM1 goes from Low to High and keeps the same Low without switching in a case where when SEL is at Low, ALM1 goes from Low to High.

The switching unit 7 selects the first clock distribution system CIN0 when SEL is at Low and selects the second clock distribution system CIN1 when SEL is at High to output the selection result as COUT.

(Description of Operation of Clock Switching Device)

Next, operation of the respective components of the clock switching device shown in FIGS. 1 to 3 will be described with reference to the time charts shown in FIGS. 4 to 7.

In FIG. 1, the clocks CIN0 and CIN1 having approximately the same frequency which are generated by separate oscillation sources are supplied all the time and the switching unit 7 selects either one of the clocks to output the selected clock as COUT.

First, as an example, description will be made of operation of switching to CIN1 when with CIN0 selected by the switching unit 7, missing of one upper side pulse of the clock pulses of CIN0 occurs as abnormality.

In FIG. 2, compare the phases of the first clock pulse T0 and its one-cycle preceding clock pulse T0' and when the phase of T0 precedes, instruct the counter 13 to count up and when the phase of T0 succeeds, instruct to count down.

The variable delay circuit 11 increments or decrements the amount of delay according to the value of the counter 13.

Figure 4:
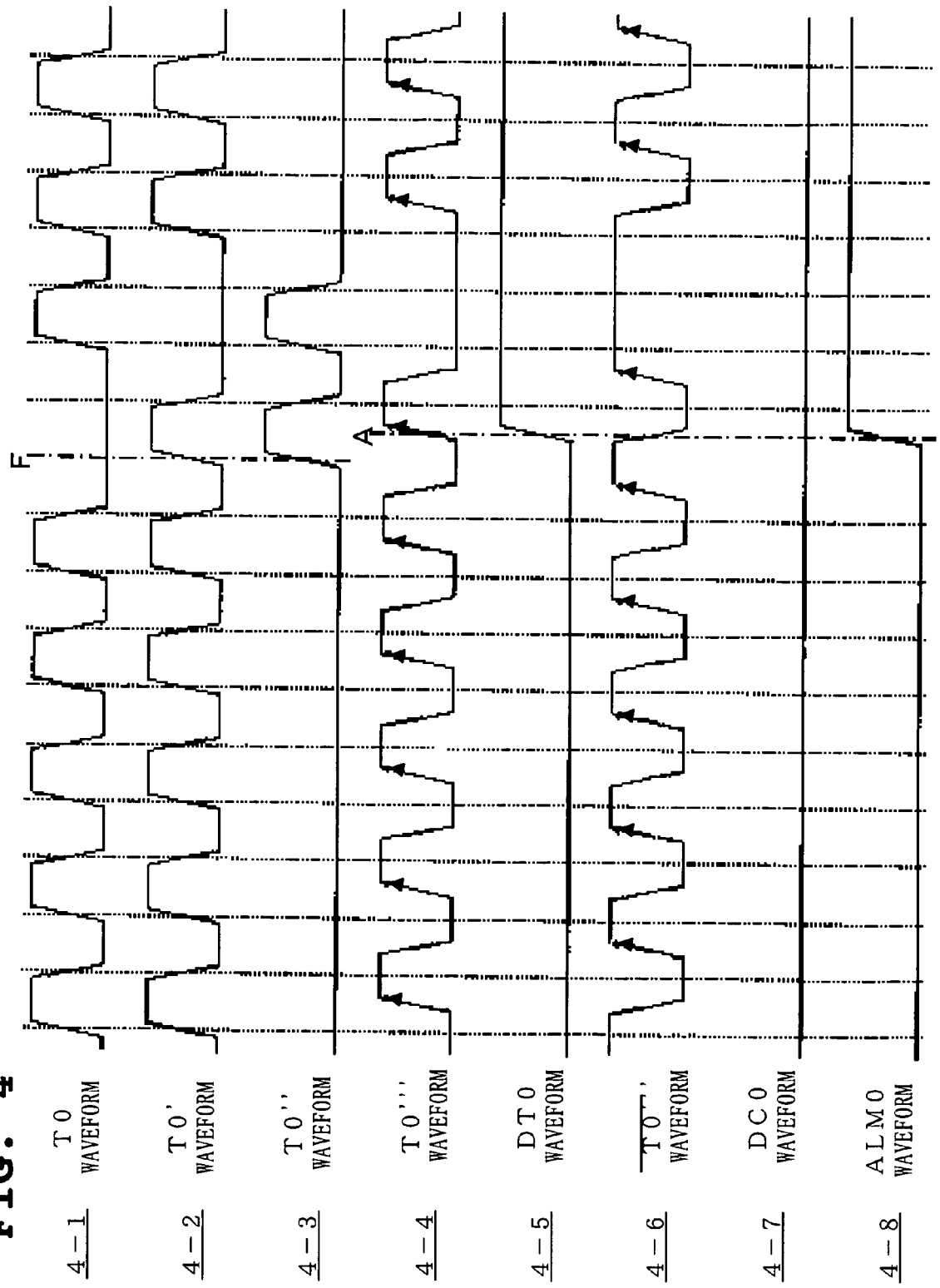
FIG. 4 is a time chart showing operation of the component of the clock switching device according to the embodiment of the present invention.

This enables the count value of the counter 13 to be adjusted to make the variable delay circuit 11 have the amount of delay equivalent to just one cycle of the clock CIN0, so that the phase of T0' matches the phase of T0 (4-1, 4-2 in FIG. 4).

The ExOR circuit 21 in the first abnormality detection unit 2 outputs a result T0" of exclusive OR operation of T0 and T0'. In a case, for example, where when missing of one upper side pulse of the clock pulses of CIN0 occurs at the time of F in FIG. 4 as abnormality, such a waveform as shown in 4-3 in FIG. 4 is output.

The fixed delay circuit 24 and the gate 25 apply a specific delay to the phase T0' to output both the positive logic T0'" and the negative logic /T0'" (4-4, 4-6 in FIG. 4).

The selector 22-1 and the F/F 23-1 output DT0 obtained by taking in and holding the logic 1 (High level) of T0" at the leading edge of T0'" and brings DT0 to High level at the edge A of T0'" (4-5 in FIG. 4).

At that time, although the selector 22-2 and the F/F 23-2 take in the value of T0" at the trailing edge of T0'" (rise of /T0'"), because at the trailing edge of T0'" (rise of /T0'"), T0" has logic 0 (Low level) as shown in 4-3 and 4-6 in FIG. 4, DC0 remains Low unchanged (4-7 in FIG. 4).

Because the OR circuit 26 outputs a result of logical OR of DT0 and DC0 as ALM0, ALM0 attains High after the time point A in FIG. 4 (4-8 in FIG. 4).

In FIG. 3, the phase comparator circuit 52 in the phase adjustment unit 5 for switching compares the phases of a certain clock pulse D0 of the first clock distribution system CIN0 and a certain clock pulse D1 of the second clock distribution system CIN1 and when the phase of D0 precedes, instructs the counter 53-0 to count up and the counter 53-1 to count down and when the phase of D0 succeeds, instructs the counter 53-0 to count down and the counter 53-1 to count up.

The variable delay circuit 51-0 increments or decrements the amount of delay according to a value of the counter 53-0 and the variable delay circuit 51-1 increments or decrements the amount of delay according to a value of the counter 53-1.

Figure 5:
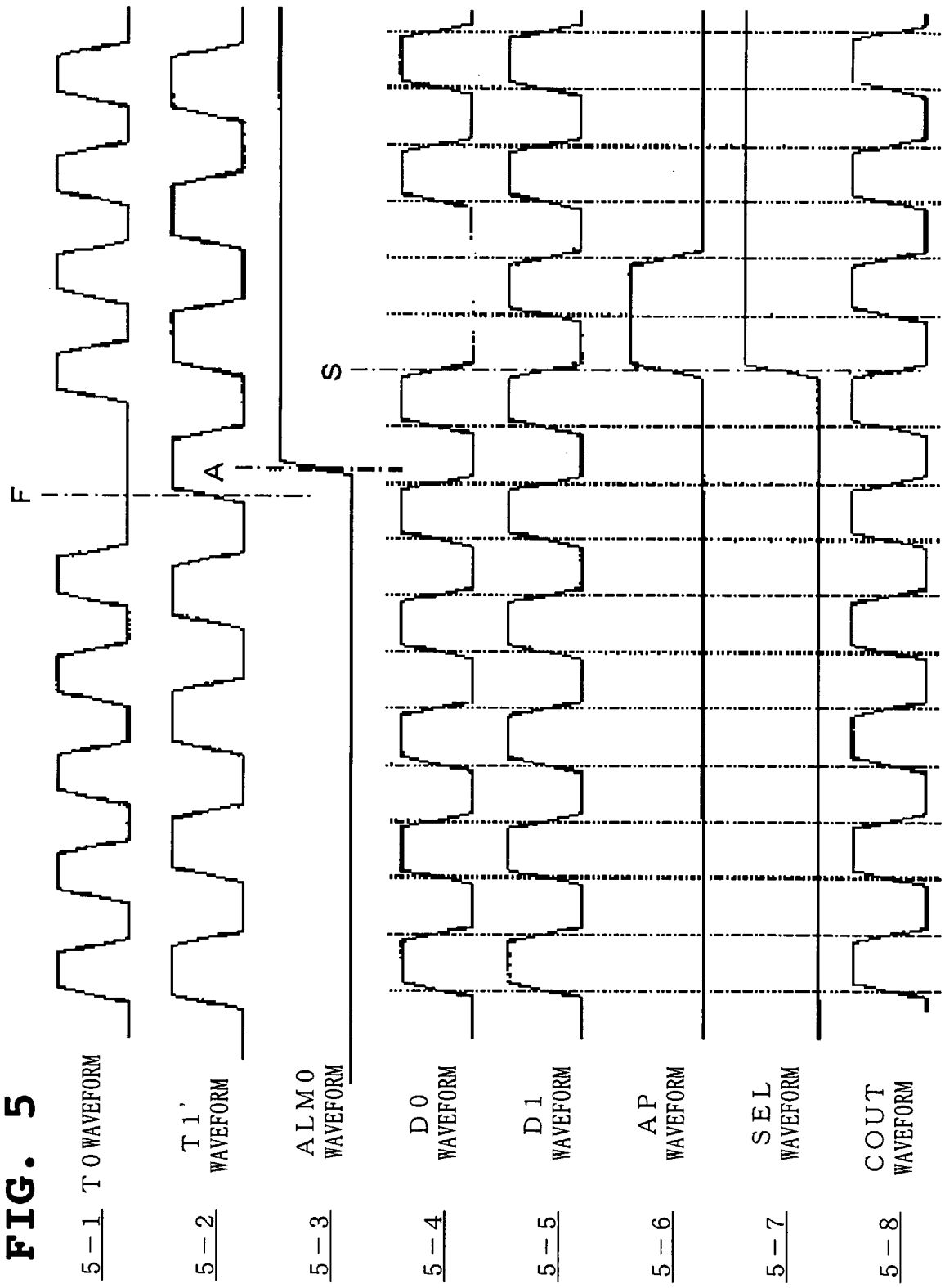
FIG. 5 is a time chart showing operation of the component of the clock switching device according to the embodiment of the present invention.

At this time, since CIN0 and CIN1 are from different oscillation sources, in order to match the phases of D0 and D1, the counters 53-0 and 53-1 count up or down all the time to make subtraction or addition of counter values of the counters 13 and 33 in the phase adjustment units 1 and 3 for detection before the variable delay circuits 51-0 and 51-1 go to the MAX side or the MN side (5-1, 5-2 of FIG. 5).

This keeps a state where the phases of a certain clock pulse D0 of the first clock distribution system CIN0 and a certain clock pulse D1 of the second clock distribution system CIN1 are coincident with each other (5-4, 5-5 in FIG. 5).

Since the switching signal SEL is at Low, when ALM0 goes from Low to High at the time point A (5-3 in FIG. 5), the switching signal generation unit 6 generates signals AP0 and AP'" obtained by differentiation at the trailing edge of the clock pulse D1 to invert a value (SEL) of an F/F 61 from Low to High at the time point S (5-5, 5-6, 5-7 in FIG. 5).

Upon inversion of the value (SEL) of the F/F 61 from Low to High at the time point S, the switching unit 7 switches the output clock COUT from the first clock distribution system CIN0 to the second clock distribution system CIN1 (5-8 in FIG. 5).

At that time, since the phases of a certain clock pulse D0 of CIN0 and a certain clock pulse D1 of CIN1 are matched at the input unit of the switching unit 7, the output clock COUT continues by all appearances, so that automatic switching to the back-up clock distribution system is possible without interrupting the processing of the device.

As an example, description will be made of the operation of switching to CIN1. This operation is executed with CIN0 selected by the switching unit 7. An abnormality occurs when CIN0 is missing one lower side pulse of the clock pulses In FIG. 2, the phase comparator circuit 12 in the first phase adjustment unit 1 for detection compares the phases of a certain clock pulse T0 of the first clock distribution system CIN0 and a one-cycle preceding clock pulse T0' and when the phase of T0 precedes, instructs the counter 13 to count up and when the phase of T0 succeeds, instructs to count down.

The variable delay circuit 11 increments or decrements the amount of delay according to the value of the counter 13.

This enables the count value of the counter 13 to be adjusted to make the variable delay circuit 11 have the amount of delay equivalent to just one cycle of the clock CIN0 to match the phase of T0' with the phase of T0 (6-1, 6-2 in FIG. 6).

The ExOR circuit 21 in the first abnormality detection unit 2 outputs a result T0" of exclusive OR operation of T0 and T0' and in a case, for example, where when missing of one lower side pulse of the clock pulses of CIN0 occurs at the time of F in FIG. 6 as abnormality, outputs such a waveform as shown in 6-3 in FIG. 6.

The fixed delay circuit 24 and the gate 25 apply a specific delay to the phase T0' to output both the positive logic T0'" and the negative logic /T0'" (6-4, 6-6 in FIG. 6).

The selector 22-2 and the F/F 23-2 output DC0 obtained by taking in and holding the logic 1 (High level) of T0" at the trailing edge of T0'" and brings DC0 to High level at the trailing edge A of T0'" (leading edge of /T0'") (6-7 in FIG. 6).

At that time, although the selector 22-1 and the F/F 23-1 take in the value of T0" at the leading edge of T0'", because at the leading edge of T0'", T0" has the logic 0 (Low level) as shown in 6-3 and 6-4 in FIG. 6, DT0 remains Low unchanged (6-5 in FIG. 6).

Because the OR circuit 26 outputs a result of logical OR of DT0 and DC0 as ALM0, ALM0 attains High after the time point A in FIG. 6 (6-8 in FIG. 6).

Operation of the phase adjustment unit 5 for switching, the switching signal generation unit 6 and the switching unit 7 in FIG. 3 is the same as that executed when an upper side pulse has abnormality in the clock pulses of CIN0 as described above (7-1 to 7-7 in FIG. 7) and the switching unit 7 switches the output clock COUT from the first clock distribution system CIN0 to the second clock distribution system CIN1 at the time point S in FIG. 7 (7-8 in FIG. 7).

While the foregoing is the description of the operation of switching to CIN1 when with the first clock distribution system CIN0 selected by the switching unit 7, a failure occurs in a clock pulse of the first clock distribution system CIN0, the embodiment shown in FIGS. 1 to 3 enables switching to CIN0 by completely the same operation when with the second clock distribution system CIN1 selected by the switching unit 7, a failure occurs in a clock pulse of the second clock distribution system CIN1.

Although when with CIN0 selected by the switching unit 7, there occurs a failure in a clock pulse of CIN1, the second abnormality detection unit 4 brings ALM1 to High, because the value (SEL) of the F/F 61 in the switching signal generation unit 6 is Low, AP" remains Low unchanged and the value (SEL) of the F/F 61 is not inverted.

In addition, similarly in a case where with CIN1 selected by the switching unit 7, a clock pulse of CIN0 has abnormality, although the first abnormality detection unit brings ALM0 to High, because the value (SEL) of the F/F 61 in the switching signal generation unit 6 is High, AP" remains Low unchanged and the value (SEL) of the F/F 61 is not inverted.

As described in the foregoing, the present invention has the effects set forth below.

First effect is enabling automatic switching to the back-up clock distribution system without interrupting processing of the device because in the two different lines of clock distribution systems whose oscillation sources are different, phases of the first clock distribution system and the second clock distribution system are matched by the input unit of the switching unit.

Second effect is reducing a jitter by the use of a quartz oscillator with high precision as a clock oscillation source because phase adjustment is conducted by the delay circuit without using a VCO (voltage controlled oscillator).

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A clock switching device which switches a clock to be supplied to an information processing device, comprising:
a unit which detects, out of a plurality of clock pulses applied, abnormality in a waveform of one of said plurality of clock pulses applied that is being output;
a unit which, when said abnormality in a waveform is detected, switches to and outputs other clock pulse whose phase is matched with a phase of one of said plurality of clock pulses applied that is being output;
an abnormality detection unit which detects lack of coincidence in a logical level between a current clock pulse and a one-cycle preceding clock pulse as abnormality in a waveform on the basis of said plurality of clock pulses;
a phase adjustment unit for switching which adjusts the phase of said other clock pulse to the phase of said clock pulse being output,
a switching unit which switches to and outputs said other clock pulse whose phase is adjusted by said phase adjustment unit for switching based on detection of lack of coincidence in a logical level by said abnormality detection unit; and
a phase adjustment unit for detection which matches a phase of a current clock pulse and a phase of a one-cycle preceding clock pulse on the basis of said plurality of clock pulses, wherein
said phase adjustment unit for detection outputs a clock pulse being output and other clock pulse to said phase adjustment unit for switching.

2. The clock switching device as set forth in claim 1, comprising:
a switching signal generation unit which generates a signal for switching to other clock pulse when said abnormality detection unit detects lack of coincidence, wherein
said switching unit switches a clock pulse based on the switching signal from said switching signal generation unit.

3. A clock switching device which switches a clock to be supplied to an information processing device, comprising:
a unit which detects, out of a plurality of clock pulses applied, abnormality in a waveform of one of said plurality of clock pulses applied that is being output;
a unit which, when said abnormality in a waveform is detected, switches to and outputs other clock pulse whose phase is matched with a phase of one of said plurality of clock pulses applied that is being output;
an abnormality detection unit which detects lack of coincidence in a logical level between a current clock pulse and a one-cycle preceding clock pulse as abnormality in a waveform on the basis of said plurality of clock pulses;
a phase adjustment unit for switching which adjusts the phase of said other clock pulse to the phase of said clock pulse being output,
a switching unit which switches to and outputs said other clock pulse whose phase is adjusted by said phase adjustment unit for switching based on detection of lack of coincidence in a logical level by said abnormality detection unit;
a phase adjustment unit for detection which matches a phase of a current clock pulse and a phase of a one-cycle preceding clock pulse on the basis of said plurality of clock pulses; and
a switching signal generation unit which generates the signal for switching to other clock pulse when said abnormality detection unit detects lack of coincidence, wherein
said phase adjustment unit for detection outputs a clock pulse being output and other clock pulse to said phase adjustment unit for switching, and, wherein
said switching unit switches a clock pulse based on the switching signal from said switching signal generation unit.

4. A clock switching method of switching a clock to be supplied to an information processing device, comprising the step of:
detecting, out of a plurality of clock pulses applied, abnormality in a waveform of one of said plurality of clock pulses applied that is being output, and switching to and outputting other clock pulse whose phase is matched with a phase of one of said plurality of clock pulses applied that is being output;

detecting lack of coincidence in a logical level between a current clock pulse and a one-cycle preceding clock pulse as abnormality in a waveform on the basis of said plurality of clock pulses;

adjusting the phase of said other clock pulse to the phase of said clock pulse being output;

switching to and outputting said other clock pulse whose phase is adjusted by a phase adjustment unit for switching based on detection of lack of coincidence in said logical level;

matching a phase of a current clock pulse and a phase of a one-cycle preceding clock pulse on the basis of said plurality of clock pulses.

5. The clock switching method as set forth in claim 4, comprising the step of:

generating a signal for switching to other clock pulse when lack of coincidence in said logical level is detected, wherein a clock pulse is switched based on said switching signal.

6. A clock switching method of switching a clock to be supplied to an information processing device, comprising the step of:

detecting, out of a plurality of clock pulses applied, abnormality in a waveform of one of said plurality of clock pulses applied that is being output, and switching to and outputting other clock pulse whose phase is matched with a phase of one of said plurality of clock pulses applied that is being output;

detecting lack of coincidence in a logical level between a current clock pulse and a one-cycle preceding clock pulse as abnormality in a waveform on the basis of said plurality of clock pulses;

adjusting the phase of said other clock pulse to the phase of said clock pulse being output;

switching to and outputting said other clock pulse whose phase is adjusted by a phase adjustment unit for switching based on detection of lack of coincidence in said logical level;

matching a phase of a current clock pulse and a phase of a one-cycle preceding clock pulse on the basis of said plurality of clock pulses, and generating a signal for switching to other clock pulse when lack of coincidence in said logical level is detected, wherein a clock pulse is switched based on said switching signal.

* * * * *